(12) United States Patent
Mo et al.

(10) Patent No.: US 9,398,553 B2
(45) Date of Patent: Jul. 19, 2016

(54) TECHNIQUE FOR IMPROVING LDP-IGP SYNCHRONIZATION

(71) Applicant: Cisco Technology, Inc., San Jose, CA (US)

(72) Inventors: Bin Mo, Acton, MA (US); David Ojemann, Harvard, MA (US); George Swallow, Boston, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/808,469

(22) Filed: Jul. 24, 2015

(65) Prior Publication Data
US 2015/0334667 A1    Nov. 19, 2015

Related U.S. Application Data

(63) Continuation of application No. 13/349,302, filed on Jan. 12, 2012, now Pat. No. 9,124,484.

(51) Int. Cl.
| | |
|---|---|
| *H04L 12/28* | (2006.01) |
| *H04J 3/06* | (2006.01) |
| *H04W 56/00* | (2009.01) |
| *H04L 12/723* | (2013.01) |
| *H04L 12/751* | (2013.01) |

(52) U.S. Cl.
CPC ............ *H04W 56/002* (2013.01); *H04L 45/02* (2013.01); *H04L 45/507* (2013.01)

(58) Field of Classification Search
CPC ..... H04L 45/50; H04L 45/023; H04L 45/507; H04L 45/02; H04W 56/002

USPC .......................... 370/401, 254, 255, 503, 351
See application file for complete search history.

(56) References Cited

U.S. PATENT DOCUMENTS

| | | |
|---|---|---|
| 8,477,795 B2 | 7/2013 | Kini et al. |
| 8,681,823 B2 | 3/2014 | Kini et al. |

(Continued)

OTHER PUBLICATIONS

Oran, D. "OSI IS-IS Intra-domain Routing Protocol", Network Working Group Request for Comments (RFC) 1142, Published by Digital Equipment Corp., Feb. 1990, pp. i-152.

(Continued)

*Primary Examiner* — Hoang-Chuong Vu
(74) *Attorney, Agent, or Firm* — Polsinelli PC

(57) ABSTRACT

A technique may improve LDP-IGP synchronization in a MPLS network when an interface of a router coupled to a communications link along a shortest path between a source router and a destination router becomes newly active. Specifically, an IGP adjacency may be held down over the newly active link while a LDP adjacency is established over the link. The router may inject a temporary, non-redistributable route having a large administrative weight into its routing table utilizing addresses learned during establishment of the LDP adjacency. The injected route ensures that there is a reachable route to a peer router so that LDP may converge. After LDP has converged and all needed label bindings have been distributed in the MPLS network utilizing the injected route, IGP executing on the router may advertise a normal cost metric for the link associated with the newly active interface, and IGP convergence may be completed.

19 Claims, 7 Drawing Sheets

(56) References Cited

U.S. PATENT DOCUMENTS

| | | | |
|---|---|---|---|
| 2003/0023893 A1* | 1/2003 | Lee | H04L 45/00 714/4.5 |
| 2007/0217419 A1 | 9/2007 | Vasseur | |
| 2011/0096780 A1 | 4/2011 | Darwish | |
| 2013/0010589 A1* | 1/2013 | Kini | H04L 45/50 370/219 |
| 2013/0021943 A1* | 1/2013 | Lu | H04L 45/023 370/254 |
| 2014/0146828 A1* | 5/2014 | Kini | H04L 45/02 370/401 |

OTHER PUBLICATIONS

Andersson, L. et al. "LOP Specification", Network Working Group Request for Comments (RFC) 5036, Published by Cisco Systems, Inc., Oct. 2007, pp. 1-136.

Moy, J. "OSPF Version 2", Network Working Group Request for Comments (RFC) 2328, Published by Ascend Communications, Inc., Apr. 1998, pp. 1-245.

Jork, M. et al. "LOP IGP Synchronization", Network Working Group Request for Comments (RFC) 5443, Published by GENBAND, British Telecom and Cisco Systems, Inc., Mar. 2009, pp. 1-8.

\* cited by examiner

| PREFIX/MASK 302 | OUTGOING INTERFACE 304 | NEXTHOP ADDRESS 306 | ADMINISTRATIVE WEIGHT 308 | COST 310 |
|---|---|---|---|---|
| T_b/32 | INTERFACE AB | ADDR_INTERFACE BA | 250 | 200 |
| ... | ... | ... | ... | ... |

ROUTE 320 → (points to T_b/32)

ROUTING TABLE 300

TECHNIQUE FOR IMPROVING LDP-IGP SYNCHRONIZATION

RELATED APPLICATIONS

This application is a continuation of U.S. patent application Ser. No. 13/349,302, entitled "TECHNIQUE FOR IMPROVING LDP-IGP SYNCHRONIZATION," filed Jan. 12, 2012, which is incorporated herein by reference in its entirety.

TECHNICAL FIELD

The present disclosure relates generally to computer networks and, more particularly, to a technique for improving LDP-IGP synchronization in an MPLS network.

BACKGROUND

A Multiprotocol Label Switching (MPLS) network may provide Virtual Private Network (VPN) service for selected packets (traffic) transported between nodes, e.g., routers, over communication links of the network using label switched paths (LSPs). A Label Distribution Protocol (LDP) may be employed to establish the MPLS LSPs along a shortest path between a source router and a destination router as determined by an Interior Gateway Protocol (IGP) executing throughout the network. As a result, neighboring (peer) routers in the network may establish IGP as well as LDP adjacencies and logical peer connections (sessions) over the links for the purpose of exchanging/distributing routing information and abstracting the network topology.

Specifically, the peer routers along the shortest path may establish operational LDP sessions over the links to exchange label bindings needed to provide the VPN service. If an LDP session is not operational over a link along the shortest path, traffic may be dropped and the VPN service may fail. Such a situation may occur when an interface of a router coupled to the link becomes newly active, causing the link to come up and establishing an IGP adjacency that enables Internet Protocol (IP) forwarding of traffic over the link prior to either establishment of the LDP adjacency and session or distribution of all needed label bindings.

To reduce such VPN traffic drop, IGP and LDP may be synchronized to ensure that LDP converges (i.e., the LDP adjacency and session are fully established and that all label bindings are distributed) before IGP converges (i.e., the IGP adjacency and session are established and all routing information is distributed) over the link coupled to the newly active interface of the router. Request for Comments (RFC) 5443, entitled "LDP-IGP Synchronization", dated March 2009, describes a technique that synchronizes IGP and LDP by discouraging use of the link for IP traffic forwarding as long as LDP has not converged. To that end, IGP executing on the router may advertise, e.g., via a link state advertisement (LSA) transmission or "flush", a maximum cost metric for the link coupled to the newly active interface resulting in, e.g., a first LSA flush and a first shortest path first (SPF) routing computation. After LDP has converged and the labels have been distributed in the MPLS network, IGP at the router may then advertise a normal cost metric for the link resulting in a second LSA flush and a second SPF computation. Thus, the technique results in two rounds of LSAs and SPF computation for each newly active interface, which may lead to scalability and performance problems for the router when many interfaces are consecutively activated in a short period of time.

A second technique for implementing LDP-IGP synchronization delays establishment of ("holds down") the IGP adjacency over the link associated with the newly active interface. While IGP adjacency is held down, LDP convergence may be completed over an alternate path that enables a router to reach a peer router of the shortest path. After LDP has converged and the label bindings have been distributed in the MPLS network via the alternate reachable path, IGP may advertise a normal cost metric for the link resulting in, e.g., a single LSA flush and a single SPF computation. However, this second technique requires existence of an alternate reachable path between the router and a peer router.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example routing table.

DESCRIPTION OF EXAMPLE EMBODIMENTS

Overview

According to one or more embodiments of the disclosure, a technique may improve LDP-IGP synchronization in a MPLS network when an interface of a router coupled to a communications link along a shortest path between a source router and a destination router becomes newly active, thereby establishing an IGP adjacency over the link, and where an alternate path between the router and a peer router may not exist. According to the improved LDP-IGP synchronization technique, the IGP adjacency may be held down over the link while a LDP adjacency is established with the peer router over the link. During establishment of the LDP adjacency (e.g., a hello adjacency), the router may receive a LDP hello message from the peer router and, from the received LDP hello message, may learn the peer router's transport address as well as an address of the peer router's interface coupled to the link. The router may then inject a temporary, non-redistributable route into its routing table utilizing the learned addresses, where the injected route may be assigned a large administrative weight to discourage the router from "choosing" the injected route. The injected route ensures that there is a reachable route to the peer router so that LDP may converge. After LDP has converged and all needed label bindings have been distributed in the MPLS network utilizing the injected route, IGP executing on the router may advertise a normal cost metric for the link associated with the newly active interface, and IGP convergence may be completed in the network. Advantageously, the technique improves LDP-IGP synchronization while performing a single LSA flush and a single SPF computation in the MPLS network.

Description

A computer network is a geographically distributed collection of nodes interconnected by communication links and segments for transporting information between end nodes, such as personal computers and workstations. Many types of networks are available, with the types ranging from local area networks (LANs) to wide area networks (WANs). The nodes typically communicate over the network by exchanging discrete frames or packets of information (e.g., traffic) according to predefined protocols, such as the Transmission Control Protocol/Internet Protocol (TCP/IP). In this context, a protocol consists of a set of rules defining how the nodes, such as routers, interact with each other.

Since management of interconnected computer networks can prove burdensome, smaller groups of computer networks may be maintained as routing domains or autonomous systems (i.e., network areas). Network areas are typically coupled together by conventional "intradomain" routers configured to execute intradomain routing protocols, and are generally subject to a common authority. It may be desirable, however, to increase the number of nodes capable of exchanging data; in this case, interdomain routers executing interdomain routing protocols are used to interconnect nodes of various network areas.

Figure 1:
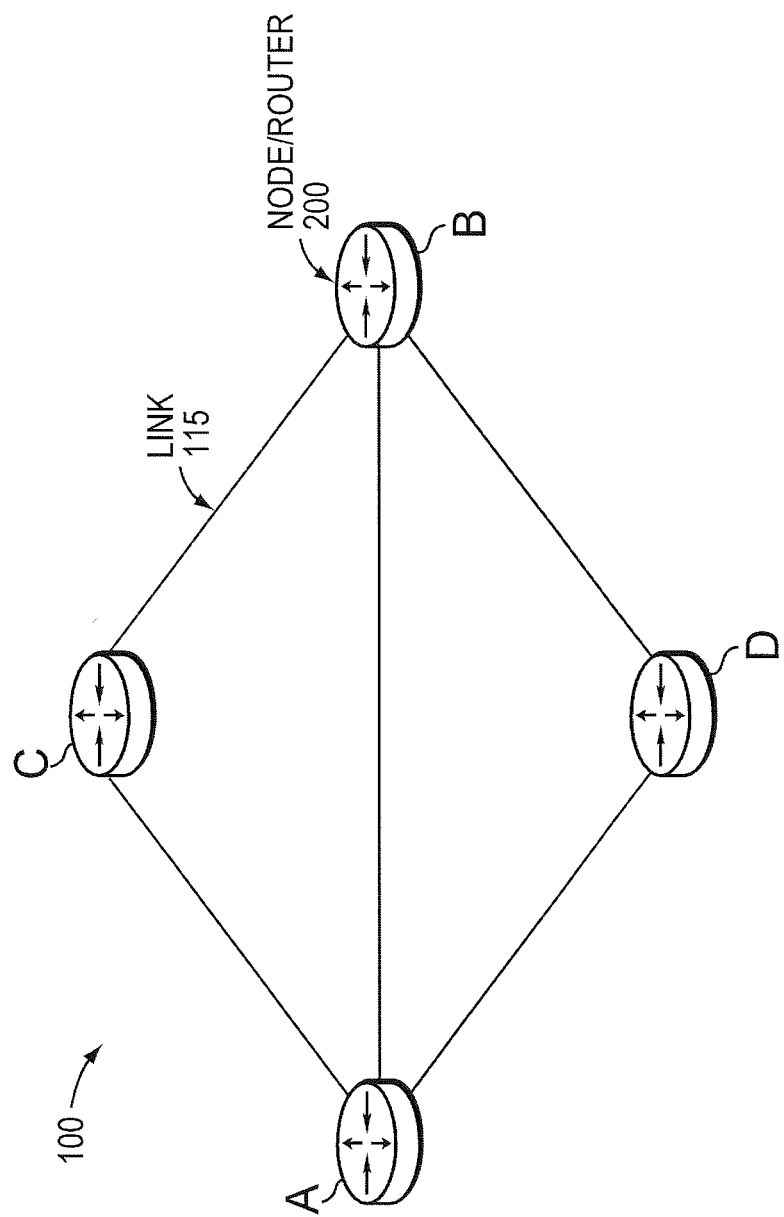
FIG. 1 illustrates an example network area.

FIG. 1 illustrates an example network area 100 having nodes 200 (e.g., routers A-D) interconnected by communication links 115. Those skilled in the art will understand that any number of nodes, devices and/or links may be used in the computer network, and that the view shown herein is for simplicity. Those skilled in the art will also understand that while the embodiments described herein are described generally, they may apply to any network configuration within a network area, or throughout multiple network areas.

Nodes in a network area are typically configured to forward information using "interior gateway" routing protocols. These IGP protocols may define the manner with which routing information and network-topology information are exchanged and processed in the network area. For instance, IGP protocols typically provide a mechanism for distributing network address information, utilizing advertisements for example, corresponding to a set of nodes and subnetworks that are reachable (i.e., accessible) to other nodes in network area 100. Using these routing advertisements, each node 200, e.g., router, of network 100 may populate and store the routing and network topology information in a routing table 300 (FIG. 3), so as to maintain a consistent "view" of the network area's topology. This process continues until the routing table of each router converges to stable values, and is known as IGP convergence. Examples of interior gateway routing protocols may include conventional link-state protocols, such as the Open Shortest Path First (OSPF) protocol, the Intermediate-System-to-Intermediate-System (IS-IS) protocol, the Resource Reservation Protocol (RSVP), and the interior Border Gateway Protocol version 4 (iBGP). The OSPF and IS-IS protocols are well-known and described in more detail in the Internet Engineering Task Force (IETF) publications Request for Comments (RFC) 2328, entitled "OSPF Version 2," dated April 1998 and RFC 1142, entitled "OSI IS-IS Intra-domain Routing Protocol," dated February 1990.

Figure 2:
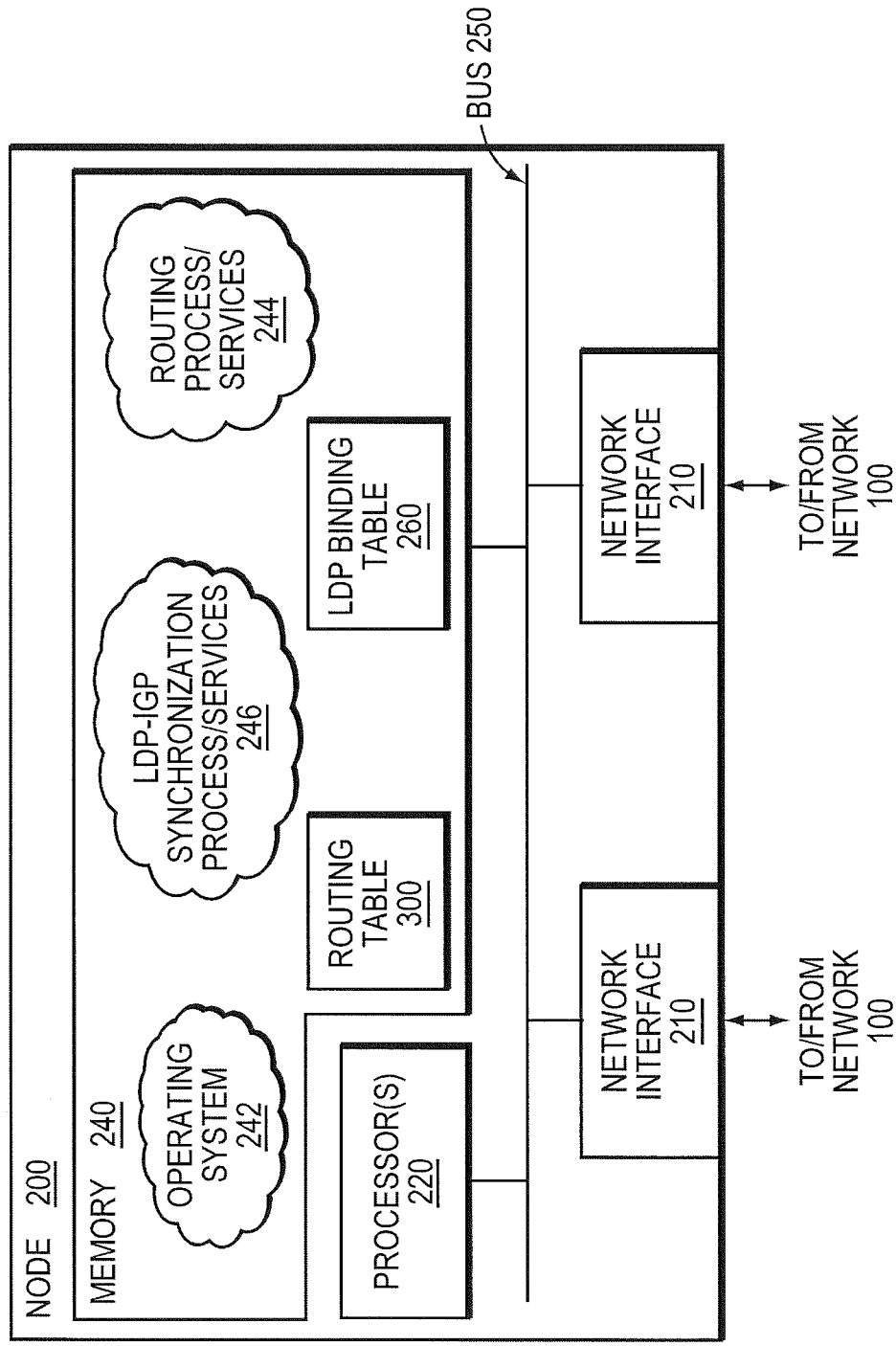
FIG. 2 illustrates an example node.

FIG. 2 illustrates an example network node 200 that may be used with one or more embodiments described herein. The node, such as a router, may comprise a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, as known to those skilled in the art.

The memory 240 comprises a plurality of locations that are addressable by the processor(s) 220 and the network interfaces 210 for storing software programs and data structures associated with the embodiments described herein. The processor 220 may comprise necessary elements or logic adapted to execute the software programs and manipulate the data structures, such as LDP binding table 260 and routing table 300. These tables may reside in memory to store routing and label information needed for the services provided by the router. For example, routing table 300 may store routing information that lists the "routes" to particular network destinations (e.g., prefixes/masks), and in some cases, metrics (distances) associated with those routes. In the case of a particular router in network 100, routing table 300 may include further information about the topology of the network 100 immediately around it (e.g., next hops).

An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the node. These software processes and/or services may comprise routing process/services 244, and LDP-IGP synchronization process/services 246. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

Routing process/services 244 contain computer executable instructions executed by processor 220 to perform functions provided by one or more routing protocols, such as IGP and/or LDP, as will be understood by those skilled in the art. These functions may be configured to manage the routing table 300, e.g., information used to render forwarding decisions for IP forwarding, and the LDP binding table 260, e.g., information used to distribute labels within the network 100, as well as other functions associated therewith. It is noted that changes in the network topology, for example due to a link, node or interface failure, may be communicated among nodes 200 using routing protocols, such as the conventional OSPF and IS-IS link-state protocols (e.g., to "converge" to an identical view of the network topology). These changes may also be reflected in the label bindings distributed among the nodes using a label distribution protocol, such as the conventional LDP protocol (e.g., to further enable convergence to an identical view of the network topology).

FIG. 3 is an example routing table 300 that may be used with one or more embodiments described herein. The routing table 300 may include one or more routes 320, wherein each route includes a prefix/mask field 302, an outgoing interface field 304, a nexthop address field 306 (e.g., an address of an interface on a peer router), an administrative weight field 308, wherein a larger value of the administrative weight indicates that the route is less preferred (e.g., an administrative weight of 255 may be the maximum), and a cost field 310 that indicates a cost of using the route. Routing table 300 may be utilized by routing process/services 244 to render IP forwarding decisions for selected packets in network 100. Moreover, routing table 300 may be utilized by routing process/services 244 to distribute label bindings associated with LDP to provide VPN service to selected packets.

Further, the routing table 300 may be utilized during LDP-IGP synchronization performed by LDP-IGP synchronization process/services 246. LDP-IGP synchronization process/services 246 contains computer executable instructions executed by processor 220 to perform functions associated with ensuring that LDP convergence completes prior to completion of IGP convergence, i.e., LDP-IGP synchronization. It is noted that routing process/service 244 and LDP-IGP synchronization process/services 246 may work in conjunction to perform the one or more embodiments described herein.

The network area 100 may further be configured as a Multiprotocol Label Switching (MPLS) network that provides Virtual Private Network (VPN) service for selected packets transported between routers, e.g., routers A-D, over communication links 115 of network area 100 using label switched paths (LSPs). LDP may be employed to establish MPLS LSPs along a shortest path (i.e., of routers and links) between a source router, e.g., router A, and a destination router, e.g., router D, as determined by IGP executing on the routers throughout the network. As a result, neighboring (peer) routers in the network (and along the shortest path) may establish IGP as well as LDP adjacencies and logical peer connections (sessions) over the links for the purpose of exchanging/distributing the routing information and abstracting the network topology.

Specifically, the peer routers along the shortest path may first perform a discovery procedure by exchanging LDP hello messages, as known by those skilled in the art. After the LDP hello messages have been exchanged, LDP sessions may be established utilizing, e.g., Transmission Control Protocol (TCP) connections, over the links 115 between the peer routers. As known by those skilled in the art, TCP is a reliable stream delivery service that guarantees delivery of a data stream (e.g., label bindings) sent from a first device to a second device (e.g., routers) without duplication or losing data. A router may utilize its routing table and information contained therein to create the TCP connection needed to establish the LDP session between the peer routers so that the label bindings may be exchanged to provide the VPN service for selected packets. After the LDP sessions are established, the label bindings may be exchanged between the peer routers to provide the VPN service for selected packets. The completion of the distribution of all label bindings within network area 100 is known as LDP convergence. LDP is well-known and described in more detail in the Request for Comments RFC 5036, entitled "LDP Specification," dated October 2007.

As noted, the peer routers along the shortest path may establish operational LDP sessions over the links to exchange label bindings needed to provide the VPN service. If an LDP session is not operational over a link along the shortest path, traffic may be dropped and the VPN service may fail. Such a situation may occur when an interface of a router coupled to the link becomes newly active, causing the link to come up and establishing an IGP adjacency that enables IP forwarding of traffic over the link prior to either establishment of the LDP adjacency and session or distribution of all needed label bindings.

Figure 4:
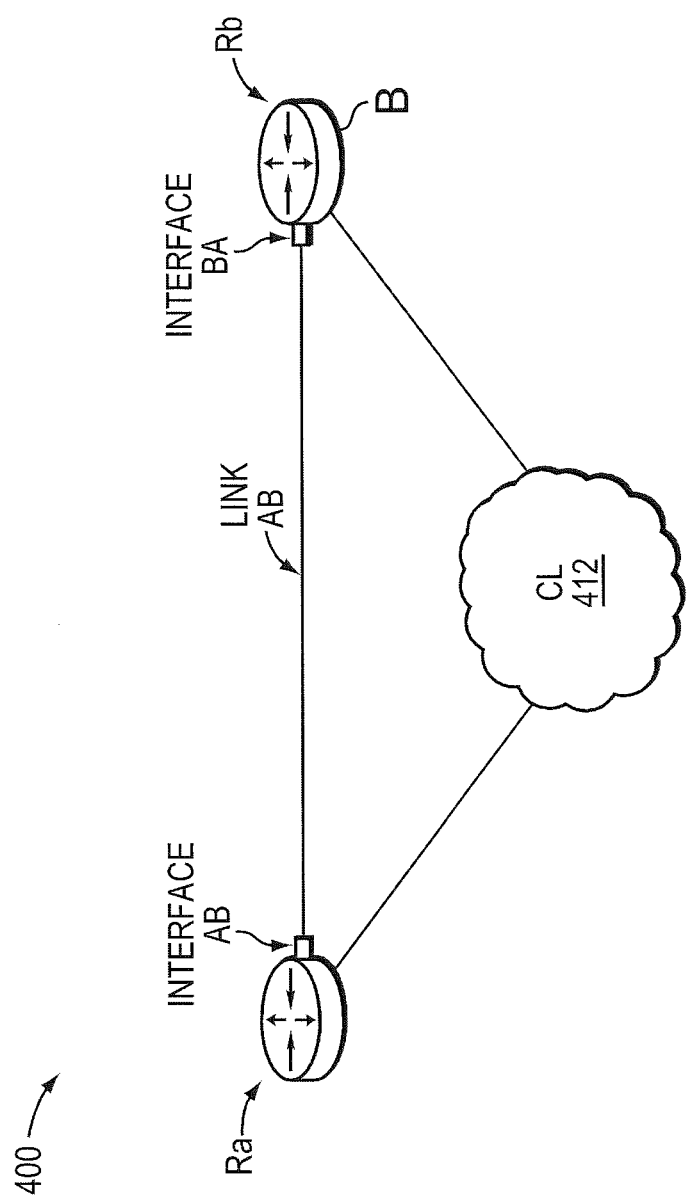
FIG. 4 illustrates an example computer network having a network interface that becomes newly active.

FIG. 4 illustrates an example network area 400 having a network interface that becomes newly active. Network area 400 includes router Ra and its interface AB, link AB, interface BA of router Rb, and network cloud CL 412, the latter of which may provide an alternate route between router Ra and router Rb. Further, network area 400 may employ both IGP to route packets in the network and LDP to provide VPN service for selected packets in the network.

To reduce VPN traffic drop ("blackhole") in response to the newly active interface, e.g., interface AB of router Ra, IGP and LDP may be synchronized to ensure that LDP converges over link AB coupled to the newly active interface before IGP converges over that link. To that end and in conventional techniques, IGP executing on router Ra may advertise, e.g., via a link state advertisement (LSA) transmission or "flush", a maximum cost metric for the link AB coupled to newly active interface AB resulting in, e.g., a first LSA flush and a first shortest path first (SPF) routing computation. After LDP has converged and the labels have been distributed in network area 400, IGP at router Ra may then advertise a normal cost metric for link AB resulting in a second LSA flush and a second SPF computation. Thus, this conventional technique results in two rounds of LSAs and SPF computation for newly active interface AB, which may lead to scalability and performance problems for routers in network area when many interfaces are consecutively activated in a short period of time.

A second conventional technique for implementing LDP-IGP synchronization delays establishment of ("holds down") the IGP adjacency over link AB associated with newly active interface AB. While IGP adjacency is held down, LDP convergence may be completed over an alternate path, i.e., cloud 412, that enables the router Ra to reach the router Rb (e.g., the peer router). Specifically, cloud 412 may include one or more routers that are LDP enabled and provide the alternate route between the router and its peer. After LDP has converged and the label bindings have been distributed in the MPLS network via cloud 412, IGP may advertise a normal cost metric for the link resulting in, e.g., a single LSA flush and a single SPF computation. However, this second technique requires existence of the alternate reachable path, specifically cloud 412 of network area 400, between router Ra and router Rb.

According to one or more embodiments of the disclosure, a technique may improve LDP-IGP synchronization in a MPLS network when an interface of a router coupled to a communications link along a shortest path between a source router and a destination router becomes newly active, thereby establishing an IGP adjacency over the link, and where an alternate path between the router and a peer router may not exist. According to the improved LDP-IGP synchronization technique, the IGP adjacency may be held down over the link while a LDP adjacency is established with the peer router over the link. During establishment of the LDP adjacency (e.g., a hello adjacency), the router may receive a LDP hello message from the peer router and, from the received LDP hello message, may learn the peer router's transport address as well as an address of the peer router's interface coupled to the link. The router may then inject a temporary, non-redistributable route into its routing table utilizing the learned addresses, where the injected route may be assigned a large administrative weight to discourage the router from "choosing" the injected route. The injected route ensures that there is a reachable route to the peer router so that LDP may converge. After LDP has converged and all needed label bindings have been distributed in the MPLS network utilizing the injected route, IGP executing on the router may advertise a normal cost metric for the link associated with the newly active interface, and IGP convergence may be completed in the network. Advantageously, the technique improves LDP-IGP synchronization while performing a single LSA flush and a single SPF computation in the MPLS network.

Figure 5:
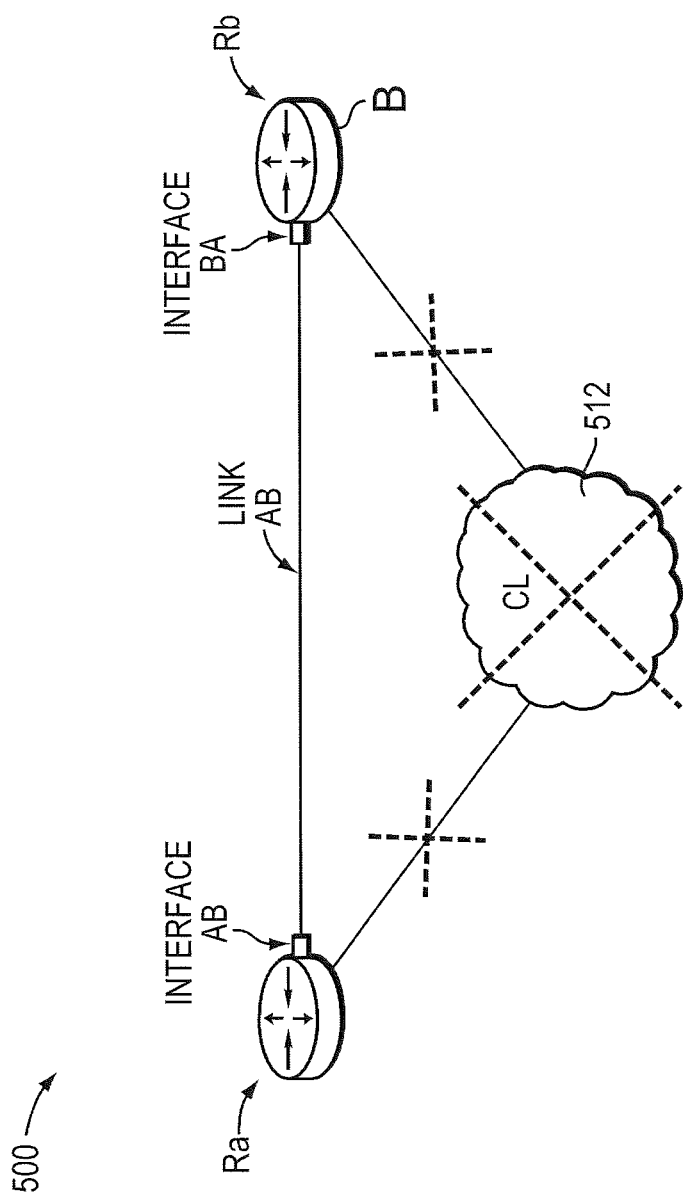
FIG. 5 illustrates another example computer network having a network interface that becomes newly active.

FIG. 5 illustrates another example network area 500 having a network interface AB that becomes newly active and that may not have an alternate path, as indicated by the dotted x through cloud CL 512, e.g., due to an alternate path not existing entirely or a link failure. When interface AB becomes newly active, IGP adjacency over link AB may be held down at router Ra, e.g., by delaying transmission of IGP discovery packets, while a LDP adjacency over link AB is established to enable LDP convergence. In an illustrative embodiment, activation of interface AB may occur in response to, e.g., a failure or error in router Ra or network 500, and subsequent correction of that failure or error. Once activated, interface AB may be utilized to transmit LDP packets over link AB to, e.g., discover a peer router for purposes of establishing a LDP hello adjacency. During establishment of the LDP adjacency, router Ra may receive a label distribution message illustratively embodied as a LDP hello message from router Rb (e.g., peer router) over link AB.

Figure 6:
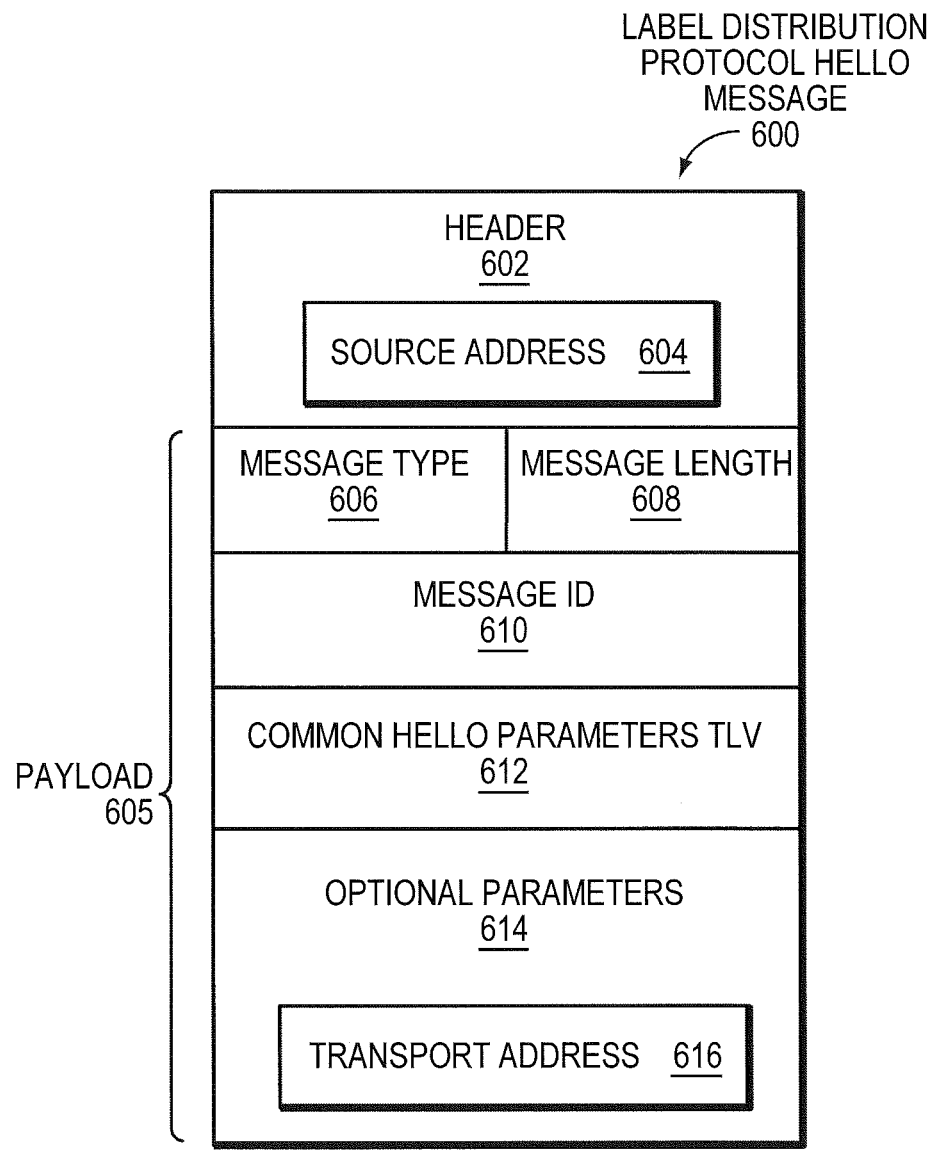
FIG. 6 illustrates an example label distribution protocol hello message.

FIG. 6 illustrates an example LDP hello message that may be advantageously used during the discovery procedure in accordance with the LDP protocol. The LDP hello message 600 is illustratively contained within a User Datagram Protocol (UDP) multicast IP packet with destination "ALL-ROUTERS" on the link, and, to that end, may include a header section 602, for example, an IP header, and a payload section 605. The header 602 may include, inter alia, a source address field 604 containing an IP address of, e.g., an interface associated with a (peer) router that transmits the message. The payload section 605 may include, inter alia, a message type field 606, a message length field 608, a message ID field 610, a common hello parameters type-length-value (TLV) field 612, and an optional parameters field 614. Message type field 606 may hold a value indicating a type of label distribution message 600. For example, a value of 0x0100 held in message type field 606 may indicate that label distribution message is an LDP hello message 600. Message length field 608 may hold a value indicating a length of a set of fields after message length field 608, such as the message ID field 610, the common hello parameters TLV field 612, and the optional parameters field 614. Message ID field 610 may hold a value indicating that message 600 is associated with other messages. Common hello parameters TLV field 612 may hold one or more values specifying parameters common to all hello messages. Optional parameters field 614 may hold a value indicating a transport address 616 associated with the peer router that transmits the message.

In an illustrative embodiment, the transport address and the interface address of the hello message 600 may be utilized in establishing TCP connections underlying the LDP sessions used to exchange label bindings in accordance with the LDP protocol. For example, Ra may learn Rb's transport address (t_b) as well as an address of Rb's interface, e.g., addr_interface BA, that is coupled to link AB from the received LDP hello message 600. Router Ra may then inject the temporary, non-redistributable route into its routing table 300 utilizing the learned addresses. For example, Ra may inject the following route 320 (FIG. 3) in its routing table 300:

<t_b/32, interface AB, addr_interface BA, 250, 200> wherein t_b/32 represents a prefix/mask of the route to reach router Rb, interface AB represents the outgoing interface of router Ra for the route to router Rb, addr_interface BA represents an address of the interface on router Rb that is utilized to establish the LDP session, 250 represents an administrative weight assigned to the route, and 200 represents a cost of the route. As known by those skilled in the art, a large value of administrative weight, e.g., 250, discourages a router, such as router Ra, from "choosing" the injected route. That is, the large administrative weight assigned to the injected route ensures that router Ra is less likely to choose that route from its routing table when selecting a preferred route over which to forward traffic to the particular prefix/mask (e.g., IP forwarding). For example, it is possible that other routing protocols (e.g., OSPF or ISIS) may have provided routes for prefix t_b/32 to the routing table. In that case, the value of the administrative weight (e.g., 250) of the LDP injected route may force routes injected by other routing protocols (e.g., the OSPF or the ISIS) to be preferred, as these other routing protocols may have assigned administrative weights to their provided routes that are smaller than the administrative weight of 250 assigned to the injected LDP route.

Illustratively, the LDP route injected into routing table 300 by router Ra ensures that the router has a specific route (via link AB) to router Rb's transport address so that an LDP session can be established with router Rb and LDP can converge via link AB. It is noted that the LDP injected route should only be used by router Ra and should not be distributed to other routers in the network. After LDP has converged over link AB and all needed label bindings have been distributed throughout network area 500, IGP executing on router Ra may advertise a normal cost metric for link AB associated with newly active interface AB. Thereafter, IGP injects a new route for the prefix into the routing table, wherein the new injected route is assigned (e.g., by a network administrator) a different administrative weight, for example, a value that is typically less than 250. As a result, IGP convergence may complete as known by those skilled in the art. It is noted that if LDP deletes the hello adjacency, LDP may withdraw (delete) the injected route from routing table 300.

Figure 7:
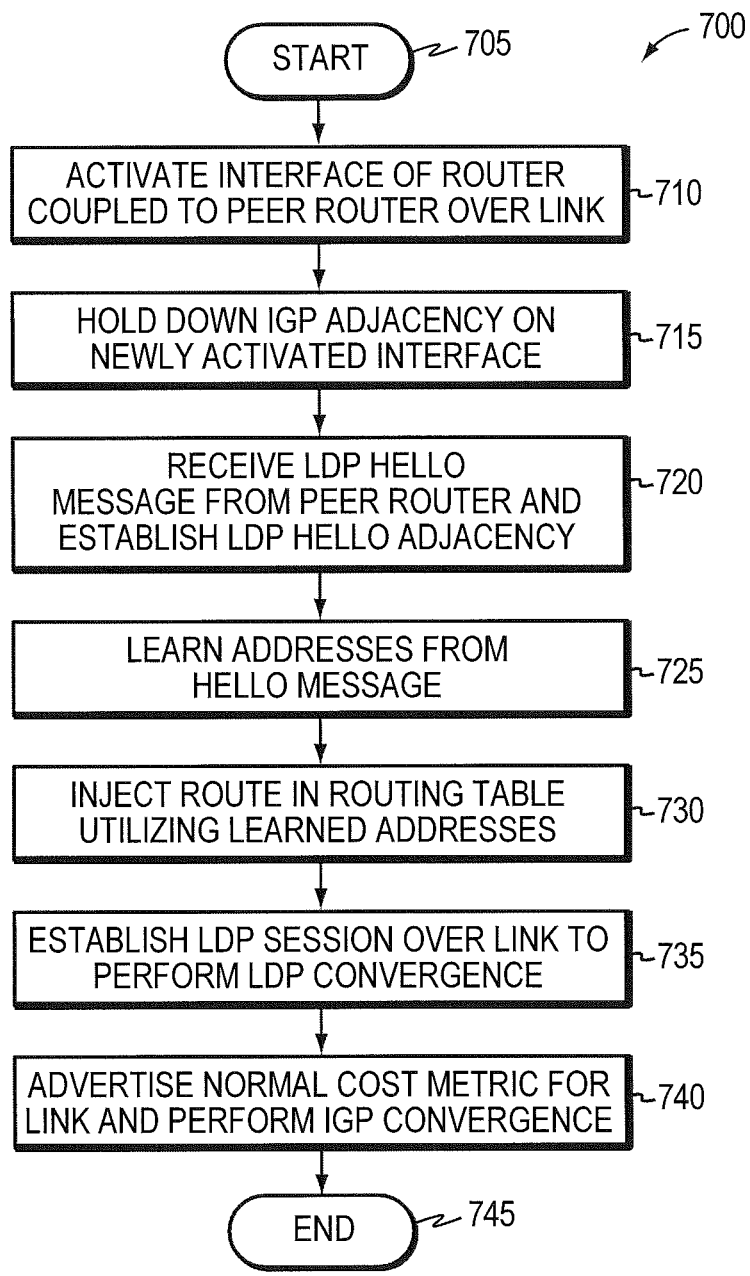
FIG. 7 illustrates an example simplified procedure for improving LDP-IGP synchronization in an MPLS network.

FIG. 7 illustrates an example simplified procedure for improving LDP-IGP synchronization in an MPLS network in accordance with one or more embodiments described herein. The procedure 700 starts at step 705 and continues to step 710 where an interface of a router becomes newly active. It should be noted that LDP and IGP, as well as LDP-IGP synchronization are illustratively enabled on the interface. The newly active interface is coupled to a peer router over a link and along a shortest path between a source router and a destination router. It should be further noted that the MPLS network may or may not have an alternate path between the source router and the peer router. In step 715, the router delays establishment of (holds down) an IGP adjacency over the link coupled to the newly activated interface and, in step 720, the router receives a LDP hello message 600 from the peer router and establishes a LDP hello adjacency with the peer router. At step 725, the router learns the transport address of the peer router by, e.g., extracting the transport address held in field 616 of message 600, and learns the address of the peer router's interface that is also coupled to the link by, e.g., extracting that address from field 604 of message 600. At step 730, the router injects a temporary, non-redistributable route 320 into its routing table 300 utilizing the learned (extracted) addresses, wherein the injected route may be assigned a large administrative weight to discourage the router from "choosing" the injected route. The injected route ensures that there is a reachable route from the router to the peer router. At step 735, an LDP session is established over the link to distribute any needed LDP bindings and enable LDP convergence. At step 740 and after LDP has converged, IGP executing on the router is allowed to establish an IGP adjacency with the peer router over the link and advertise a normal cost metric for the link coupled to the newly active interface, thereby enabling IGP convergence to ensure LDP-IGP synchronization. The procedure then ends at step 745.

Advantageously, the technique described herein improves LDP-IGP synchronization while performing a single LSA flush and a single SPF computation in a network that does not have an alternate path between a router and a peer router. Those skilled in the art will understand that any number of routers, interfaces, and/or links may be used in network described herein, and that the views shown herein are for simplicity. It is also noted that although certain embodiments are directed to a network not having an alternate path between a router and a peer router, the novel technique may also be implemented in network where an alternate path does in fact exist.

While the illustrative embodiments herein have described a method and apparatus for improving LDP-IGP synchronization in an MPLS network, it is to be understood that various other adaptations and modifications may be made within the spirit and scope of the embodiments disclosed herein. For example, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    enabling a label distribution protocol (LDP) and an interior gateway protocol (IGP) on a link between a first node and a second node;
    pausing an interior gateway protocol (IGP) convergence over the link;
    performing a label distribution protocol (LDP) convergence over the link by:
        creating a temporary and non-distributable path comprising a prefix address associated with a transport address, a network interface of a node, an interface address, and a cost,
        assigning a threshold administrative weight to the temporary and non-distributable path, wherein the threshold administrative weight is higher than a respective administrative weight of at least one different path associated with the link, and
        selecting the temporary and non-distributable path for the LDP convergence over the link, and
    completing the IGP convergence after performing the LDP convergence.

2. The method of claim 1, wherein an LDP-IGP synchronization delays the establishment of the IGP convergence.

3. The method of claim 1, wherein the LDP convergence is performed in response to an establishment of an LDP adjacency.

4. The method of claim 1, wherein the IGP convergence is completed in response to an establishment of an IGP adjacency.

5. The method of claim 1, further comprising:
    utilizing LDP label bindings to provide Virtual Private Network (VPN) service for selected traffic in a multiprotocol label switching network (MPLS).

6. The method of claim 5, wherein the LDP converges when the LDP label bindings are distributed.

7. The method of claim 1, wherein pausing the IGP convergence comprises holding down an IGP adjacency over the link.

8. A system comprising:
    a processor; and
    a computer-readable storage device having stored therein instructions which, when executed by the processor, cause the processor to perform operations comprising:
        enabling a label distribution protocol (LDP) and an interior gateway protocol (IGP) on a link between the system and a node;
        performing a label distribution protocol (LDP) convergence over the link by:
            creating a temporary and non-distributable path including a prefix address associated with a transport address, a network interface of a node, an interface address, and a cost,
            associating the temporary and non-distributable path with a threshold administrative value, wherein the threshold administrative value is higher than a respective administrative value of at least one different path associated with the link, and
            selecting the temporary and non-distributable path for the LDP convergence over the link, and
        performing an interior gateway protocol (IGP) convergence after performing the LDP convergence.

9. The system of claim 8, wherein a LDP-IGP synchronization delays the establishment of the IGP convergence.

10. The system of claim 8, wherein the LDP converges in response to an establishment of a LDP adjacency and respective neighboring connections.

11. The system of claim 8, wherein the IGP converges in response to an establishment of a IGP adjacency and its respective neighboring connections.

12. The system of claim 8, wherein the computer-readable storage device stores additional instructions which, when executed by the processor, cause the processor to perform an operation comprising: utilizing LDP label bindings to provide Virtual Private Network (VPN) service for selected traffic in a multiprotocol label switching network (MPLS).

13. The system of claim 8, wherein the LDP converges when the LDP label bindings are distributed.

14. The system of claim 8, wherein pausing the IGP convergence comprises holding down an IGP adjacency over the link.

15. The system of claim 8, wherein the instructions further cause the processor to perform operations comprising:
    pausing the IGP convergence over the link until the LGP convergence has completed.

16. A computer-readable storage device having stored therein instructions, which when executed by a processor, cause the processor to perform operations comprising:
    enabling a label distribution protocol (LDP) and an interior gateway protocol (IGP) on a link between a first node and a second node;
    pausing an interior gateway protocol (IGP) convergence over the link;
    performing a label distribution protocol (LDP) convergence over the link by:
        creating a temporary and non-distributable path comprising a prefix address associated with a transport address, a network interface of a node, an interface address, and a cost,
        assigning a threshold administrative weight to the temporary and non-distributable path, wherein the threshold administrative weight is higher than a respective administrative weight of at least one different path associated with the link, and
        selecting the temporary and non-distributable path for the LDP convergence over the link, and completing the IGP convergence after performing the LDP convergence.

17. The computer-readable storage device of claim 16, wherein a LDP-IGP synchronization delays the establishment of the IGP convergence.

18. The computer-readable storage device of claim 16, wherein pausing the IGP convergence comprises holding down an IGP adjacency over the link.

19. The computer-readable storage device of claim 16, wherein the threshold administrative weight is a maximum administrative weight associated with the LDP.

* * * * *